March 22, 1960 A. TANAKA ET AL 2,929,439
VEHICLE SEAT ADJUSTER
Filed July 30, 1958 4 Sheets-Sheet 4

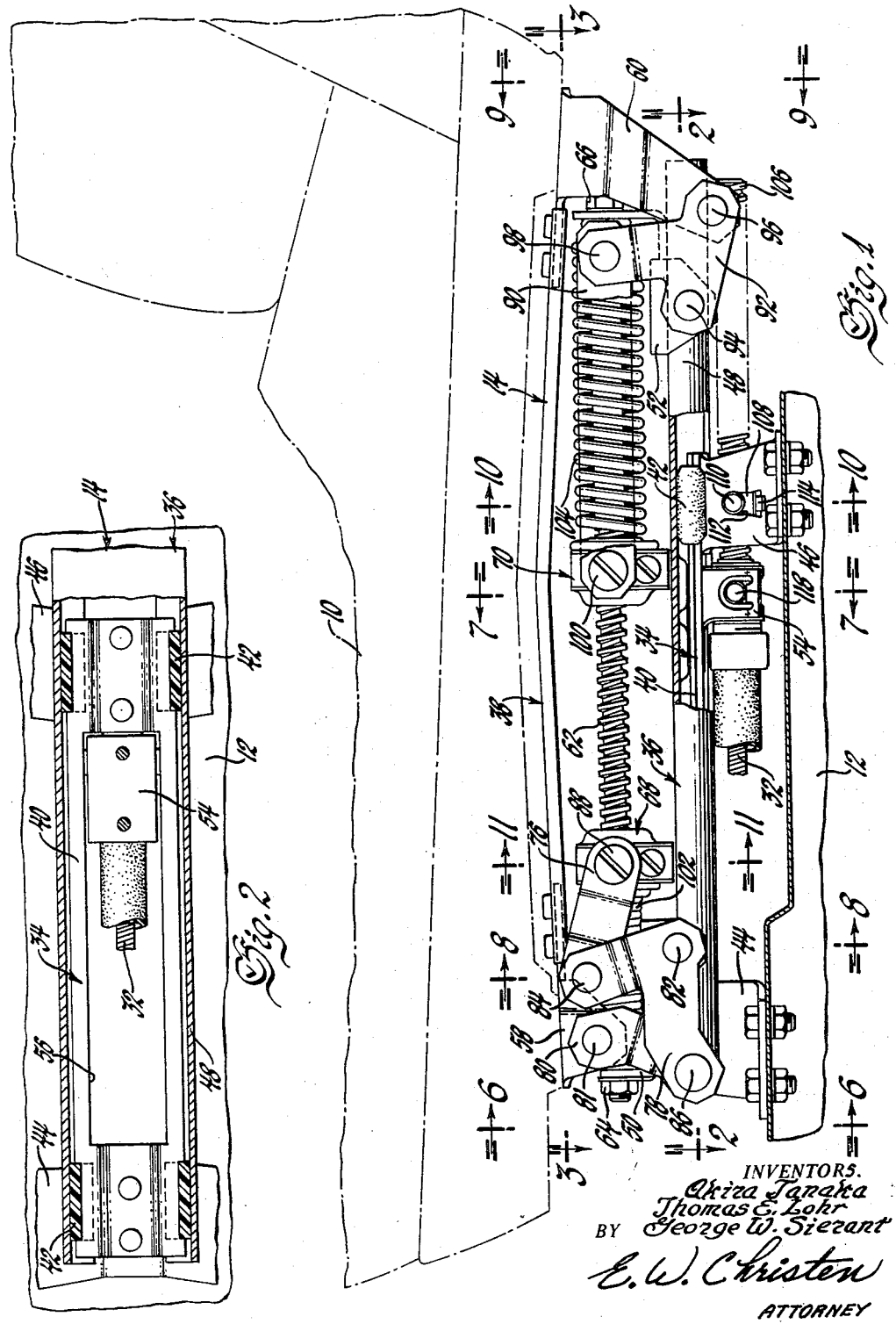

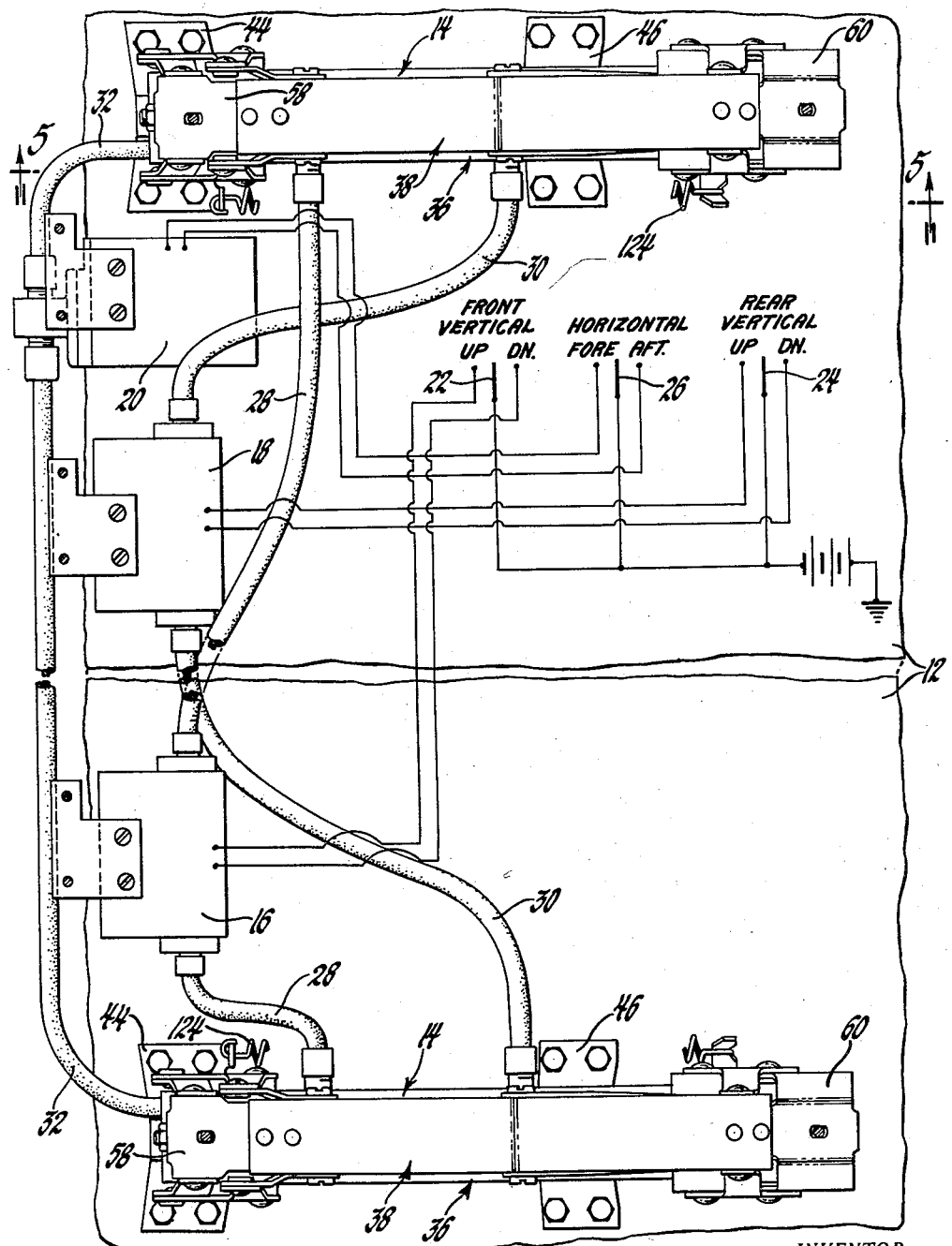

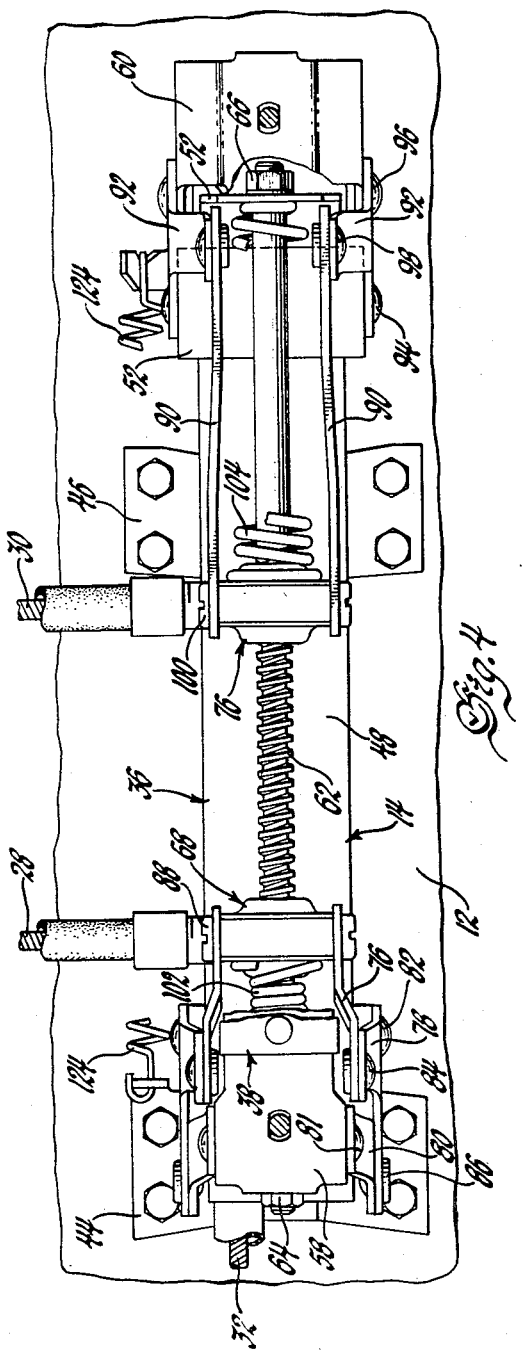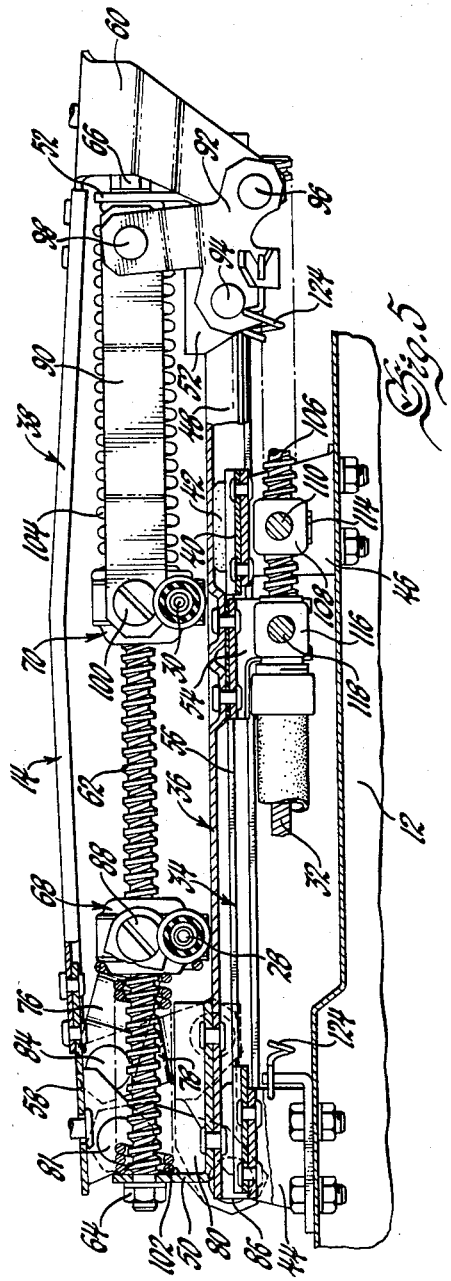

INVENTORS
Akira Tanaka
Thomas E. Lohr
BY George W. Sierant

E. W. Christen
ATTORNEY

United States Patent Office 2,929,439
Patented Mar. 22, 1960

2,929,439

VEHICLE SEAT ADJUSTER

Akira Tanaka, Thomas E. Lohr, and George W. Sierant, Detroit, Mich., assignors to General Motors Corporation, Detroit, Mich., a corporation of Delaware Application July 30, 1958, Serial No. 752,080

9 Claims. (Cl. 155—14)

This invention relates to vehicle seat adjusters and more particularly to the type which provides for tilting, vertical and horizontal adjustment.

As vehicles become lower, less space exists beneath the front seat for seat adjuster structure and it is an object of the invention to provide a compact seat adjuster adapted to fit in the available space without sacrificing strength or economy of construction.

In the drawings:

Figure 1 is a broken away side elevation of the left adjuster of the front seat of a vehicle;

Figure 2 is a broken away section of the left adjuster taken on the plane indicated by the line 2—2 of Figure 1;

Figure 3 is a top elevation of the right and left adjusters taken on the plane indicated by the line 3—3 of Figure 1;

Figure 4 is a broken away top elevation of the left adjuster;

Figure 5 is a broken away side elevation of the right adjuster taken on the plane indicated by the line 5—5 of Figure 3;

Figure 6:
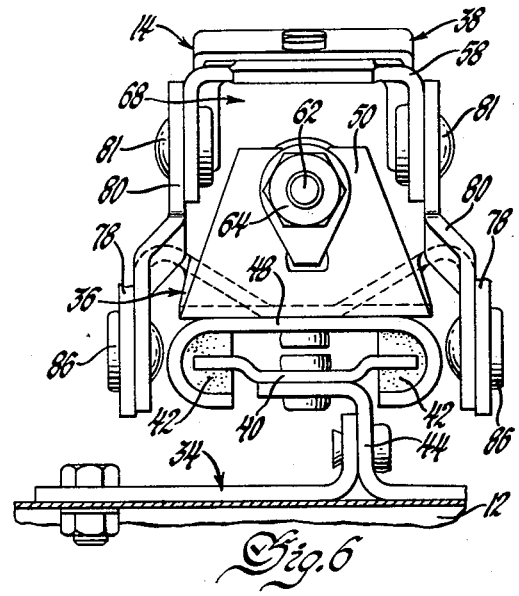
Figure 6 is a front elevation of the left adjuster taken on the plane indicated by the line 6—6 of Figure 1.
Figure 7:
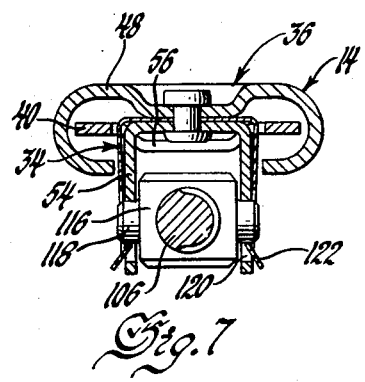
Figure 7 is a section of the left adjuster taken on the plane indicated by the line 7—7 of Figure 1.
Figure 8:
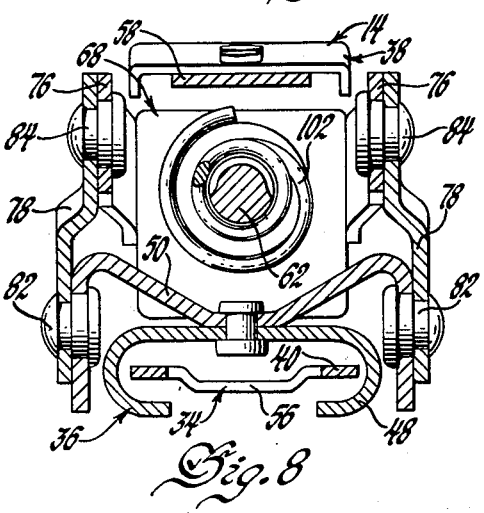
Figure 8 is a section of the left adjuster taken on the plane indicated by the line 8—8 of Figure 1.
Figure 9:
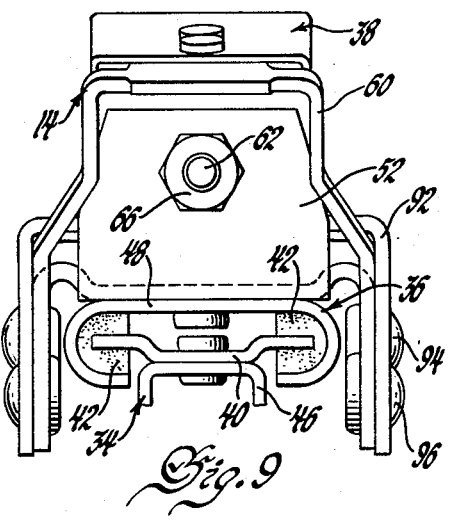
Figure 9 is a rear elevation of the left adjuster taken on the plane indicated by the line 9—9 of Figure 1.
Figure 10:
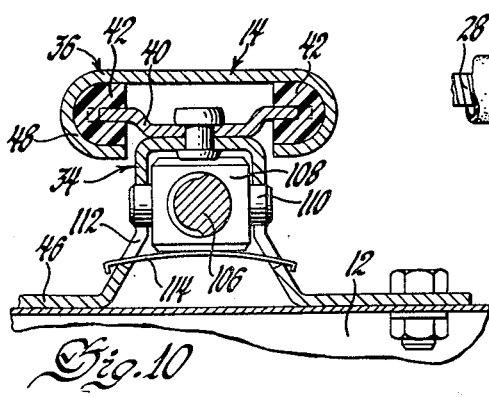
Figure 10 is a section of the left adjuster taken on the plane indicated by the line 10—10 of Figure 1.
Figure 11:
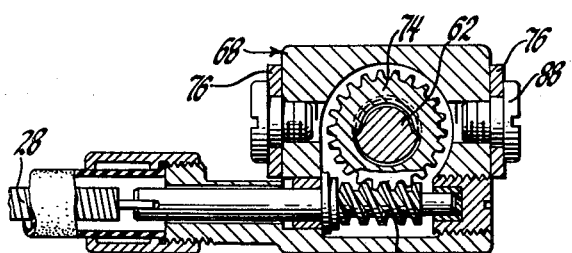
Figure 11 is a section of the left adjuster taken on the plane indicated by the line 11—11 of Figure 1.

Referring to the drawings, the front seat 10 of the vehicle is mounted on the floor 12 by right and left seat adjusters 14. The adjusters are similar so identical reference characters are used. The adjusters are powered in unison in the usual manner by reversible electric motors 16, 18 and 20 which are secured to the underside of the seat 10 and which are controlled by the driver by switches 22, 24 and 26. The motor 16 drives the front elevating linkages of the adjusters 14 through flexible cables 28 to raise or lower the forward portion of the seat when switch 22 is placed in the up or down position. The motor 18 drives the rear elevating linkages through flexible cables 30 to raise or lower the rear portion of the seat when the switch 24 is placed in the up or down position. The motor 20 drives the horizontal adjusting mechanism of the adjusters 14 through flexible cables 32 to shift the seat forward and rearward when the switch 26 is placed in the fore or aft position. The driver may manipulate the switches 22, 24 and 26 simultaneously or independently to arrive at a comfortable position.

Before describing the seat adjusters 14 in detail, it should be realized that many of their elements are assembled from metal stampings for economy reasons and that the various pivot points of the elevating linkages are joined by similar links on each side of the seat adjuster for strength purposes. To achieve brevity, the description will not differentiate between similar elements which are located on each side of the seat adjuster.

The seat adjuster 14 is superposed on frame members 34 and 36. The frame member 34 includes a track 40 mounting plastic guide shoes 42 and is secured to the floor 12 by brackets 44 and 46. The frame member 36 includes a C-sectioned track 48 horizontally slidable on the shoes 42 in fore and aft direction and has brackets 50 and 52 secured to its front and rear ends and a bracket 54 mounted intermediate its ends. The bracket 54 of the frame member 36 projects through a longitudinally extending slot 56 in the track 40 of the frame member 34.

The frame member 38 has brackets 58 and 60 secured to the front and rear ends thereof and upon which is mounted the seat 10. A threaded rod 62 is spaced between the frame members 36 and 38 and is supported against rotation on the end brackets 50 and 52 of the frame member 36 by bolts 64 and 66. Similar front and rear drive housings 68 and 70 are mounted on the threaded rod 62. The drive housing 68 rotatably supports a worm 72 which is driven by the flexible cable 28 from the motor 16. A pinion 74 is rotatably mounted in the drive housing 68 and is threaded to the threaded rod 62. The pinion 74 meshes with the worm 72 so that the drive housing 68 will be shifted back and forth along the threaded rod 62 according to the driving direction of the motor 16. In a like fashion the rear drive housing 70 will be shifted back and forth along the threaded rod 62 according to the drive direction of the motor 18.

The front ends of the frame members 36 and 38 are supported for relative movement in vertical direction in accordance with the fore and aft position of the front drive housing 68 by links 76, 78 and 80. The link 80 is pivotally secured to the bracket 58 of the frame member 38 by a rivet 81, the bell crank 78 is pivotally secured to the bracket 50 of the frame member 36 and to the links 76 and 80 by rivets 82, 84 and 86 and the link 76 is pivotally secured to the drive housing 68 by a bolt 88. The front elevating linkage prevents the drive housing 68 from rotating about the rod 62.

The rear ends of the frame members 36 and 38 are supported for relative movement in vertical direction in accordance with the fore and aft position of the rear drive housing 70 by a link 90 and bell crank link 92. The bell crank link 92 is pivotally secured to the bracket 52 of the frame member 36, to the bracket 60 of the frame member 38 and to the link 90 by rivets 94, 96 and 98. The link 90 is pivotally secured to the rear drive housing 70 by a bolt 100. The rear elevating linkage restrains the drive housing 70 against rotation about the rod 62.

Compression springs 102 and 104 are located on the front and rear ends of the rod 62 between the bracket 50 and drive housing 68 and between the bracket 52 and drive housing 70 to resiliently urge the drive housings towards each other thus urging the front and rear elevating linkages in seat raising direction to neutralize the weight of the seat and passengers. Elevating motors 16 and 18 accordingly draw substantially the same power for raising the seat as for lowering it.

The horizontal drive flexible cable 32 has a threaded shaft 106 secured to the end thereof. A nut 108 is threaded on the shaft 106 and is rotatably supported on the bracket 46 of the frame member 34 by a pivot pin 110. The bracket 46 is slotted at 112 to receive the pivot pin 110 and a nut retention clip 114. A bearing 116 supports the shaft 106 for rotation and the bearing is pivotally supported on the bracket 54 of the frame member 36 by a pin 118. The bracket 54 is slotted at 120 to receive the pivot pin 118 and a retention clip 122 is provided to retain the nut in the bracket. Since the nut 108 is secured to the frame member 34 and the bearing 116 to the frame member 36, rotation of the screw shaft 106 by the flexible cable 32 will move the seat and frame member 36 in fore and aft direction depending on the driving direction of the motor 20.

A tension spring 124 is connected across the frame members 34 and 36 by the end brackets 44 and 52 to place the horizontal adjusting mechanism under a slight preload and avoid any manufacturing tolerance rattle.

From the foregoing it is seen that the seat adjusters 14 provide a means whereby the seat 10 may be raised and lowered, tilted and moved in fore and aft direction by manipulation of the switches 22, 24 and 26 to provide the driver with a comfortable position. It is also seen that only flexible cables connect the left and right seat adjusters thus clearing the space beneath the midportion of the seat for the drive shaft tunnel of the vehicle. It will be further noted that the left and right seat adjusters employ many interchangeable parts for economy of manufacture.

While the embodiment of the invention as disclosed herein is the preferred form, it should be realized that other embodiments are readily apparent to those skilled in the art which may fall within the scope of the invention.

We claim:

1. In a seat adjuster of the type having a pair of superposed frame members and front and rear linkages interconnecting the members for independent relative movement in vertical direction, the improvement comprising a threaded rod supported against rotation by one member, front and rear drive housings each rotatably mounting a pinion that is threaded to the rod, and means interconnecting the respective housings with the respective linkages whereby said housings are secured against rotation so that driving of the pinions will shift the housings along the rod and swing the linkages to adjust the members vertically.

2. In a seat adjuster of the type having a pair of superposed frame members and front and rear bell crank linkages interconnecting the front and rear ends of the members for independent relative movement in vertical direction, the improvement comprising a threaded rod supported against rotation by the ends of one member and spaced between the members, front and rear drive housings mounted on the rod and each rotatably mounting a pinion that is threaded to the rod, and means interconnecting the respective housings with the respective linkages whereby said housings are secured against rotation so that driving of the pinions will shift the housings along the rod and swing the linkages to adjust the members vertically.

3. In a seat adjuster of the type having a pair of superposed frame members and front and rear bell crank linkages interconnecting the front and rear ends of the members for independent relative movement in vertical direction, the improvement comprising a threaded rod supported against rotation by the ends of one member and spaced between the members, front and rear drive housings mounted on the rod and each rotatably mounting a pinion therein that is threaded to the rod, and front and rear links interconnecting the respective housings with the respective linkages whereby said housings are secured against rotation so that driving of the pinions will shift the housings along the rod and swing the linkages to adjust the members vertically.

4. In a seat adjuster of the type having a pair of superposed frame members and front and rear bell crank linkages interconnecting the front and rear ends of the members for independent relative movement in vertical direction, the improvement comprising a threaded rod supported against rotation by the ends of one member and spaced between the members, front and rear drive housings mounted on the rod and each rotatably mounting a pinion therein that is threaded to the rod, front and rear links interconnecting the respective housings with the respective linkages whereby said housings are secured against rotation so that driving of the pinions will shift the housings along the rod and swing the linkages to adjust the members vertically, and front and rear compression springs encircling the rod and extending between the respective housings and the respective ends of the rod supporting member.

5. In a seat adjuster of the type having superposed first, second and third frame members, front and rear linkages interconnecting the first and second members for independent relative movement in vertical direction and tracks interconnecting the second and third members for relative movement in horizontal dirction, the improvement comprising a threaded rod supported against rotation by one member, front and rear drive housings each rotatably mounting a pinion that is threaded to the rod, means interconnecting the respective housings with the respective linkages whereby said housings are secured against rotation so that driving of the pinions will shift the housings along the rod and swing the linkages to adjust the first and second members vertically, and drive means interconnecting the second and third members for adjusting them horizontally.

6. In a seat adjuster of the type having superposed first, second and third frame members, front and rear bell crank linkages interconnecting the first and second members for independent relative movement in vertical direction and tracks interconnecting the second and third members for relative movement in horizontal direction, the improvement comprising a threaded rod supported against rotation by one member and spaced between the first and second members, front and rear drive housings each rotatably mounting a pinion that is threaded to the rod, means interconnecting the respective housings with the respective linkages whereby said housings are secured against rotation so that driving of the pinions will shift the housings along the rod and swing the linkages to adjust the first and second members vertically, a threaded shaft rotatably secured to the second member, means for rotatably driving the shaft, and a nut secured to the third member and threaded on the shaft so that the second and third members are adjusted horizontally on driving of the shaft.

7. In a seat adjuster of the type having superposed first, second and third frame members, front and rear bell crank linkages interconnecting the front and rear ends of the first and second members for independent relative movement in vertical direction and tracks interconnecting the second and third members for relative movement in horizontal direction, the improvement comprising a threaded rod supported against rotation by the ends of the second member and spaced between the first and second members, front and rear drive housings mounted on the rod and each rotatably mounting a pinion that is threaded to the rod, and means interconnecting the respective housings with the respective linkages whereby said housings are secured against rotation so that driving of the pinions will shift the housings along the rod and swing the linkages to adjust the first and second members vertically, a threaded shaft rotatably secured to the second member, means for rotatably driving the shaft, and a nut secured to the third member and threaded on the shaft so that the second and third members are adjusted horizontally on driving of the shaft.

8. In a seat adjuster of the type having superposed first, second and third frame members, front and rear bell crank linkages interconnecting the front and rear ends of the first and second members for independent relative movement in vertical direction and tracks interconnecting the second and third members for relative movement in horizontal direction, the improvement comprising a threaded rod supported against rotation by the ends of the second member and spaced between the first and second members, front and rear drive housings mounted on the rod and each rotatably mounting a pinion therein that is threaded to the rod, front and rear links interconnecting the respective housings with the respective linkages whereby said housings are secured against rotation so that driving of the pinions will shift the housings along the rod and swing the linkages to adjust the first and second members vertically, front and rear compression springs encircling the rod and extending between the respective housings and the respective ends of the second member, a threaded shaft rotatably secured to the second member, means for rotatably driving the shaft, and a nut secured to the third member and threaded on the shaft so that the second and third members are adjusted horizontally on driving of the shaft.

9. In a seat adjuster of the type having superposed first, second and third frame members, front and rear bell crank linkages interconnecting the front and rear ends of the first and second members for independent relative movement in vertical direction and tracks interconnecting the second and third members for relative movement in horizontal direction, the improvement comprising a threaded rod supported against rotation by the ends of the second member and spaced between the first and second members, front and rear drive housings mounted on the rod and each rotatably mounting a pinion therein that is threaded to the rod, front and rear links interconnecting the respective housings with the respective linkages whereby said housings are secured against rotation so that driving of the pinions will shift the housings along the rod and swing the linkages to adjust the first and second members vertically, front and rear compression springs encircling the rod and extending between the respective housings and the respective ends of the second member, a threaded shaft rotatably secured to the second member, means for rotatably driving the shaft, a nut pivotally secured to the third member and threaded on the shaft so that the second and third members are adjusted horizontally on driving of the shaft, and a tension spring interconnecting the second and third members.

References Cited in the file of this patent

UNITED STATES PATENTS

| | | |
|---|---|---|
| 1,346,710 | Hendershott | July 13, 1920 |
| 2,172,941 | Manning et al. | Sept. 12, 1939 |
| 2,809,688 | Brundage | Oct. 15, 1957 |